United States Patent [19]

Hermann

[11] 4,325,416
[45] Apr. 20, 1982

[54] APPARATUS FOR DETERMINING AND/OR CONTROLLING A FIXED FILLING LEVEL IN A CONTAINER

[76] Inventor: Eberhard F. Hermann, Sonnenweg 3, D7888 Rheinfelden-Eichsel, Fed. Rep. of Germany

[21] Appl. No.: 150,549

[22] Filed: May 16, 1980

[30] Foreign Application Priority Data

Aug. 20, 1979 [DE] Fed. Rep. of Germany ....... 2933618

[51] Int. Cl.$^3$ .............................................. B65B 3/26
[52] U.S. Cl. .................................. 141/95; 73/290 V; 137/386; 141/198
[58] Field of Search ......................... 73/290 V, 32 A; 137/386; 141/94–96, 198

[56] References Cited

U.S. PATENT DOCUMENTS

3,814,146 6/1974 Mesh ................................ 141/198 X
3,916,961 11/1974 Dilger ............................. 141/198 X Primary Examiner—Frederick R. Schmidt
Attorney, Agent, or Firm—Sughrue, Mion, Zinn, Macpeak and Seas

[57] ABSTRACT

To provide a precise determination and/or control of a filling level in containers, two vibrator elements (10, 12; 48, 52) are arranged one on top of the other and/or coaxially to each other, and at least partially encompass themselves in spaced relation to each other. They are configured like rotary vibrators having the same resonance frequency and are excited to vibrations of opposite sense of rotation for determining the filling level, whereby only one vibrator element comes into direct contact with the filling material in the container. This results in no vibration energy being transmitted to the container walls and thus the quality of the measurements is increased.

21 Claims, 4 Drawing Figures

APPARATUS FOR DETERMINING AND/OR CONTROLLING A FIXED FILLING LEVEL IN A CONTAINER

This invention relates to an apparatus for determining a fixed filling level in a container.

German Pat. No. 582,760 and British Pat. No. 1,013,186 describe apparatus having at least one vibrator rod being excited on its resonance frequency to bending vibrations, and extending into a tank to be filled, and whose vibrations are damped upon contact with the filling material so that by this change of vibration the filling level can be indicated.

However, these known apparatus for measuring the filling level have the disadvantage that the single vibrator rod is exercising considerable alternating forces upon the mounting and thus upon the walls of the container so that vibration energy is transferred to the container walls by the rod. Consequently the no-load losses of the vibrator structure, i.e. the losses of vibration energy when the structure is not immersed in the filling material, are relatively high. Therefore the system for exciting the vibrations must be powerfully dimensioned in order to maintain vibrations in the control device. However, the result will be that the vibrator structure, when immersed in heaped goods of light weight with little attenuation capacity, will not be damped sufficiently. That means that lighter bulk goods cannot be controlled with these apparatus.

The proposal was therefore submitted to have two vibrator rods, instead of one, arranged parallel to each other extending into the tank, being interconnected by a yoke at the place of mounting and that can be excited into bending vibrations of opposing senses. (German Application No. 17 73 815). In addition to the considerably larger-scaled constructive design as compared to the measuring apparatus with a single vibrator rod, this device in the form of a tuning fork has the disadvantage that between the vibrator rods powdery or fibrous filling material can be caught or, respectively, granulates can get jammed, thereby causing an attenuation of vibration although there is a low filling level.

It is therefore the object of the present invention to provide an apparatus for determining a fixed filling level in a container, which makes it possible, without any transmission of vibration energy to the walls of the container, to obtain an extremely precise control of the filling level in a container without necessitating any expensive construction. At the same time it shall be guaranteed that the vibrator structure does not supply any wrong measurements, which e.g. can be caused by filling material sticking to the structure. Moreover, the measuring apparatus for determining a filling level in a container can be manufactured in solid construction so as to render possible a mounting at any place of the container walls that will suit the particular application, without impairing the accuracy of control.

This problem is solved by an apparatus for determining the fill level of material in a container, comprising: vibrating structure having first and second vibrator elements whose vibrations are attenuated when engaging filling material present in the container, one of said vibrator elements being arranged coaxially with respect to the other vibrator element and at least partially surrounding said other element in spaced relation thereto, both of said vibrator elements being flexibly mechanically coupled for individual oscillatory vibration in a common plane about mutually spaced axes, and being so dimensioned and configured to have the same no-load resonant frequency, means for exciting said elements into vibration of mutually opposite directional phase, the first of said vibrator elements extending downwardly and adapted to engage material in the container to implement determining the fill level thereof.

By this suggested solution one gains the advantage that only one vibrator element is required to be in immediate contact with the filling material, without having the disadvantage that considerable alternating forces are exerted on the mounting means. By the particular spacial configuration, the further advantage is obtained that the dimensions of the apparatus can be reduced considerably, thereby providing a solid construction of an apparatus for determining a specified filling level in a container.

In an embodiment of the invention the (first) vibrator element extending into the container is projecting into a recess provided in the second vibrator element. As an alternative, the (first) vibrator element can be provided with a recess into which the second vibrator element is projecting.

Preferably the vibration elements in the form of oscillating vibrators are arranged each in the center of a membrane acting as a restoring spring, the plane of which in neutral position is running vertically to the axis of the respective vibrator element, whereby the outer edges of the membranes are rigidly interconnected by means of a tubular element. Thereby the vibrator elements are selected in such a manner that the torques caused by them, which act on the tube, are compensated on the tube.

In order that the center of gravity of the entire vibration structure stay at rest while the system is vibrating, the center of gravity of each vibrator element is preferably arranged in the center of the respective membrane on the axis of the vibrator element. In that way the whole tube constitutes the vibration node of the vibration structure. Preferably the vibration structure, composed of the vibrator elements, the membranes and the tubular element, with an annular membrane is nested in a screw-in piece by means of which the apparatus is mounted in the wall of the tank in which the filling level is to be determined.

In the first described embodiment the first vibrator element is preferably a solid cylinder being rigidly connected with a hollow cylinder, of which the free (lower) end is pressed flat to form a paddle. This paddle will engage the filling material to be controlled. By this paddle shape the sensitivity is increased.

The second vibrator element arranged coaxially to the first vibrator element, is preferably composed of two rigidly interconnected cylinders—an upper and a lower one—having a through bore to accommodate the upper part of the solid cylinder of the first vibrator element. Preferably the two cylinders are rigidly interconnected in the center of the membrane by means of a third cylinder likewise provided with the bore hole and of a smaller diameter as compared to the two cylinders.

In a preferred embodiment an electromagnetic system is used for exciting the vibrations. For this purpose a coil is embodied in the upper cylinder of the second vibrator element, being surrounded by a tube representing a magnetic armature, which tube defines at the same time the circumferential surface of the upper cylinder. As the coil is rigidly mounted in the upper vibrator element, it is a contributory determinant of the moment of inertia of masses. As a result, not only the weight but also the space requirements of the vibration structure are considerably reduced. The tube surrounding the coil is made of magnetic soft material. Two pins of magnetic soft material form the poles, while their sections projecting into the coil of the first vibrator element, likewise being constructed of magnetic soft material, define the yoke of the magnetic circuit of the excitation system.

To excite the vibration structure, a pulsating direct current is supplied to the coil. Preferably a piezoelectric element in form of a disc serves for a vibration measuring system, being mounted on the membrane acting as restoring spring of the first vibrator element. Of course, the piezoelectric element can be replaced by a known wire strain gauge, likewise being arranged on the membrane. The piezoelectric element as well as the wire strain gauge present the advantages that only little space is required, that the weight is light and that not only an electric but also a mechanic robustness is guaranteed. The electric signal produced by the vibration measuring system, is converted in an amplifier into the pulsating direct current, which, as mentioned above, is flowing through the coil of the excitation system. By these arrangements the vibration system on its resonance frequency is excited into vibrations, if the vibrator element extending into the container does not engage the filling material. A threshold value discriminator is connected to the output of the amplifier and indicates the state of vibration and thus the filling level.

According to the above described alternative embodiment, the first vibrator element is made in the form of a hollow cylinder, being connected at one end to the membrane, and the other lower end has been pressed flat to form a paddle in order to obtain equal sensitivities for determining the filling level. The second vibrator element is preferably a solid cylinder, of which the lower end is extending into the hollow cylinder. Thereby the solid cylinder, preferably in the region of its upper half, is connected to the respective membrane in the center of the same.

Preferably the vibrator elements in regard to their masses, are constructed in such a manner that the center of gravity of each vibrator element is positioned in the respective fulcrum, i.e. in the center of the pertinent membrane, so that the center of gravity of the total system remains at rest during the vibration process in order to prevent vibration energy from being transmitted to the container walls.

Especially in the suggested alternative embodiment of the invention, however, it is possible that the centers of gravity of the two vibrators can also be positioned outside of the respective fulcrum. By this displacement of the centers of gravity one gains the advantage of a further simplification and reduction of the vibration structure without running the risk that the total system, with regard to its center of gravity, will vibrate during the vibration process. In order to obtain this advantage, the vibration amplitudes of the centers of gravity of the two vibrator elements from their neutral positions, when multiplied with the respective masses pertaining thereto, must be of equal value. In addition thereto, the two individual vibrator elements must be telescoped so far that the centers of gravity of the two bodies are coinciding in neutral position.

By a suitable distribution of the masses of the vibrator elements in front of and behind the respective membrane, the centers of gravity of the vibrator can be displaced without any difficulty in such a manner that the above indicated requirement is complied with. Of course, the displacement of the centers of gravity of the vibrator elements can be effected outside of the plane of the membrane, in the first suggested solution, too.

Preferably piezoelectric systems are suited for vibration excitation and vibration measuring systems. Thereby the tube connecting the outer edges of the two membranes can be divided transversely to the axis. Two piezoelectric elements being disposed between the sections in the vibration plane, must be clamped in between the two tube pieces in such a manner that one of the two piezoelectric elements serves as a vibration exciting system and the other one as a vibration responsive system.

An amplifier arranged between these systems causes the system to vibrate if the rod extending into the container is not covered by the filling material, and the system is damped if the rod extending into the container engages the filling material. A threshold value discriminator at the output of the amplifier indicates the state of vibration and thus the filling level.

Further embodiments of the invention will follow from the claims below.

Further details, advantages and characteristics of the invention will appear from the following description of the drawing, where.

Figure 2:
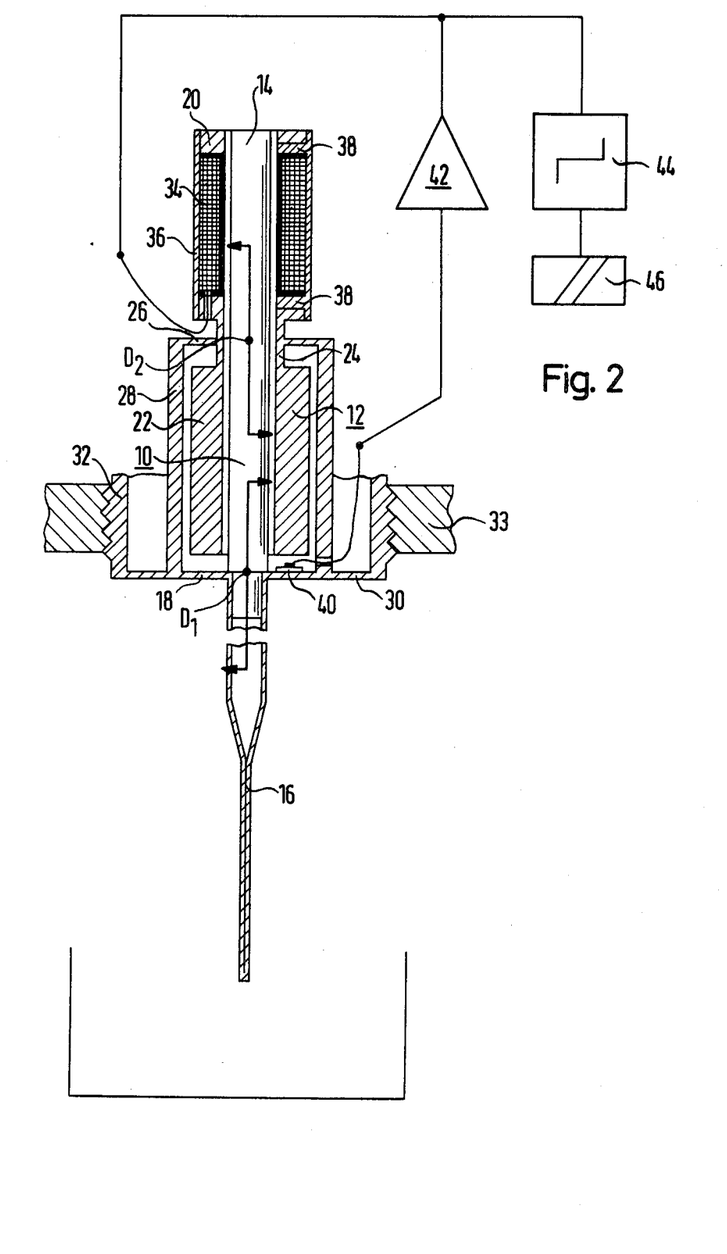
FIG. 2 is a sectional view through an embodiment of the apparatus according to the invention.
Figure 4:
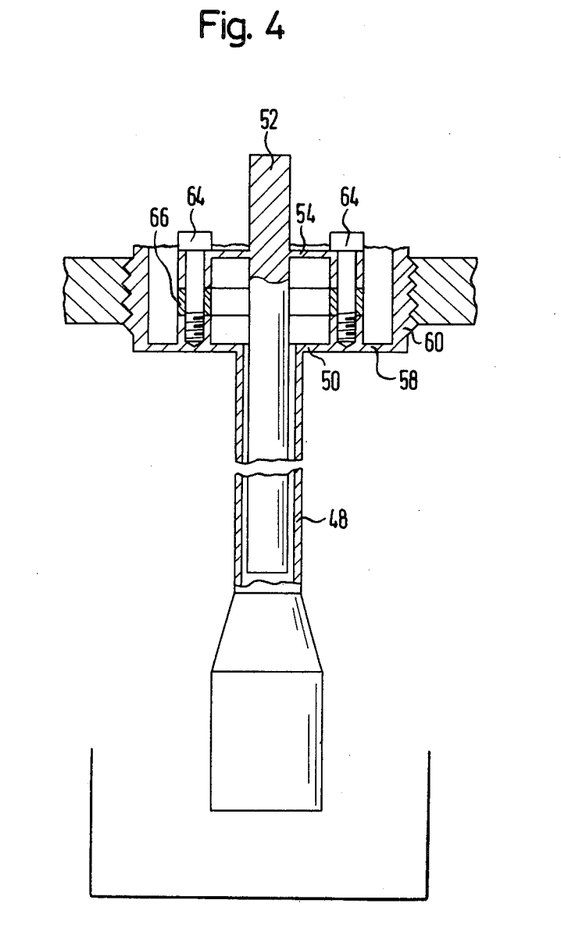
FIG. 4 is a sectional view through the embodiment example according to FIG. 3 but rotated through 90°.

FIG. 2 shows a first embodiment of the apparatus according to the invention. This apparatus includes two vibrator elements 10 and 12, being arranged coaxially to each other and at least partially surrounding the other in spaced relation. The vibrator element 10 is composed of a solid cylinder 14 in the form of a rod and a hollow cylinder 16 in the form of a tubular part. The tubular part 16 faces the inside of the container and extends into it. The rod 14 and the tubular part 16 are rigidly interconnected in the center of a membrane 18. The end of the tubular part 16 extending into the container is pressed flat transversely to the sense of vibration being indicated by the arrow, thus increasing the effective surface, and as a result one achieves an increase of sensitivity of the apparatus according to the invention. By the tubular configuration of the lower section 16 of the vibrator element 10 obviously the flat-pressing is considerably facilitated. (FIG. 4 shows a side view of a paddle-shaped lower part of a vibrator element extending into the container). As compared to the membrane 18, the vibrator element 10 is stiff in itself. If e.g. a torque is now acting upon the vibrator element 10 in direction of the arrow, it moves from its neutral position around axis $D_1$. Thereby the vibrator element 10 in itself remains dimensionally stable. The membrane 18 is elastically deformed and exerts a restoring torque upon the vibrator element 10. If the vibrator element 10 is released, it will start to vibrate around its position of rest. Since each point of the vibrator element 10 with regard to the axis $D_1$ is at the same time deflecting from neutral position by the same angle, it is a pure oscillation motion of rotation around the axis $D_1$ positioned on a diameter of the membrane 18. The vibrator element 12 of the second vibrator element is composed of the cylinders 20 and 22, being rigidly interconnected by means of a third cylinder 24 having a smaller diameter than the cylinders 20 and 22, which third cylinder lies in the center of a membrane 26.

An axial recess is provided in the cylinders 20, 22, 24 preferably in the form of a hole bored from end to end, into which the rod-shaped section 14 of the first vibrator element 10 is extending. The second vibrator element 12, too, as compared to the membrane 26 is stiff in itself, so that upon a respective excitation a oscillation motion will take place on axis $D_2$ being positioned on a diameter of the membrane 26.

The resonance frequencies of the two oscillators are dependent on the inertia moment of the masses of the respective bodies and on the moment of force per radian of the pertinent membrane acting as a restoring spring.

The vibrator elements are dimensioned in such a manner as to present the same resonance frequency. This can be accomplished without any difficulties by an appropriate dimensioning of the respective vibrator elements 10, 12 and the pertinent membranes 18, 26.

The outer edges of the membranes 18, 26 each are connected to a tube 28 at one end thereof. If the two vibrator elements are excited into vibrations of mutually opposite directional phase but within the same plane, then the torques caused by the elastic deformation of the membranes 18, 26 are acting on the tube 28 and compensate themselves. If the mass distribution of the two rotary oscillating bodies is selected in such a manner that their centers of gravity each are positioned on their axis $D^1$ or $D_2$ respectively, the two centers of gravity will not move during the vibration process, and consequently the center of gravity of the entire system does not move either. The tube 28, therefore, on its total length defines the vibration node of the vibration system. By means of an annular membrane 30 the vibration system is fixed in a screw-in piece 32 at the tube 28. The soft mounting by means of the ring membrane 30 soft in vibration-technical respect absorbs any residual vibration on the tube 28 via the screw-in piece 32 to a container wall 33.

An electromagnetic system has turned out to be especially advantageous when used for a vibration exciting system. To this effect, a coil 34 is rigidly mounted in the upper cylinder 20. The coil 34 is surrounded by a tube 36. The tube 36 is made of magnetic soft material and serves as a magnetic armature. Two pins 38 of magnetic soft material serve as magnetic poles. The pins 38 are radially embedded in the cylinder 20 above and below the coil 34 in the plane of vibration, and are extending from the outer tube 36 to the axial bore hole. The pins 38 as magnetic poles conduct the magnetic field of the coil 34 via an air gap to the solid cylinder 14 of the first vibrator element 10, which at least within the region of the coil 34 is made of magnetic soft material. The tube 36, the poles 38 and the rod-shaped section 14 of the first vibrator element 10 define a magnetic circuit. The tube 36, the poles 38 and the coil 34 represent—as mentioned above—a part of the oscillating mass of the upper cylinder 20 of the second vibrator element 12, and thus with their mass contribute to the moment of inertia and at the same time constitute the vibration excitation system. By this double function one gains a more compact construction and simultaneously a reduced weight of the apparatus pursuant to the invention. The connection wires for the coil 34 are brought out close to the membrane 26, i.e. at the vibration node, so that the vibration system cannot be damped by the connection wires.

When a pulsating direct current is flowing through the coil 34, the vibrator element 10 is drawn towards the poles 38 in the rhythm of the fluctuations of current, i.e. the two vibrator elements 10 and 12 in the form of oscillators, in a common plane of vibration, are excited into oscillations with opposite directional phase. For a vibration responsive system one uses preferably a piezoelectric ceramic disc 40, being arranged in the vibration plane of the membrane 18, preferably glued thereon. By the periodic deformation of the membrane 18 during the vibration process, corresponding forces are acting upon the piezoelectric disc 40 so that it will give out an alternating voltage signal, of which the amplitude and frequency are corresponding to the mechanic vibration amplitude of the vibration system and the frequency of same. The periodic deformation of the membrane 18 can also be measured by a wire strain gauge (not shown) that can be mounted on the membrane 18 in a conventional manner. One will then obtain a periodic change of resistance of the wire strain gauge that can be transformed electronically into an alternating voltage signal. Both possibilities for measuring vibrations offer the advantage that only little space is required, that their weight is light and that they are very robust in electric as well as in mechanic respects and that they are inexpensive. As mentioned above, the vibration responsive system is mounted on the membrane 18, thus on the membrane of the vibrator element 10, of which the lower part 16 is extending into the space of the container and which is damped when touching the filling material. Therefore an attenuation is directly acting upon the vibration responsive system and and thus causes an especially quick and precise attenuation of the entire system.

When the vibration structure is vibrating, the vibration responsive system 40 produces an electric signal, of which the frequency equals the vibration frequency of the oscillator 10, and of which the amplitude is proportional to the mechanic vibration amplitude of the oscillator 10. This electric signal is supplied to an amplifier 42, is amplified therein and transformed into a pulsating direct current which is led to the coil 34. Thus we have a feed-back system. If the frequency of this pulsating current equals the resonance frequency of the two vibrator elements 10, 12, one obtains a maximum amplitude of vibrator and consequently a maximum amplitude of the electric signal from the vibration responsive system 40. In this case the highest ring amplification of the feed-back system is attained at the resonance frequency of the mechanic vibration system. If the ring amplification is higher than 1, then the system starts to vibrate by itself as does each known oscillator, and that on the resonance frequency of the mechanic vibration structure. The vibration amplitudes are limited in that the amplifier 42 is overcharged. If section 16 of the vibrator element 10 extending into the space of the container, is covered by the filling material, the vibration is damped by withdrawal of energy. Thereby a threshold value discriminator 44 connected in series after the amplifier 42 will respond, whereby again a relay 46 following after the threshold value discriminator 44 can be switched over. If the lower section of the vibrator element 10 in form of a paddle is uncovered again by a decreasing of the filling level, the system will start vibrating anew and the threshold value discriminator 44 restores the relay 46. As the mechanic vibration structure obviously hardly loses any vibration energy so far it is not immersed in the filling material, the excitation power through the amplifier need only be very little in order to make the system start vibrating and to keep up the vibration. Thereby the system, however, can be induced to respond even by a very slight attenuation, as is caused e.g. by very light bulk goods.

Figure 3:
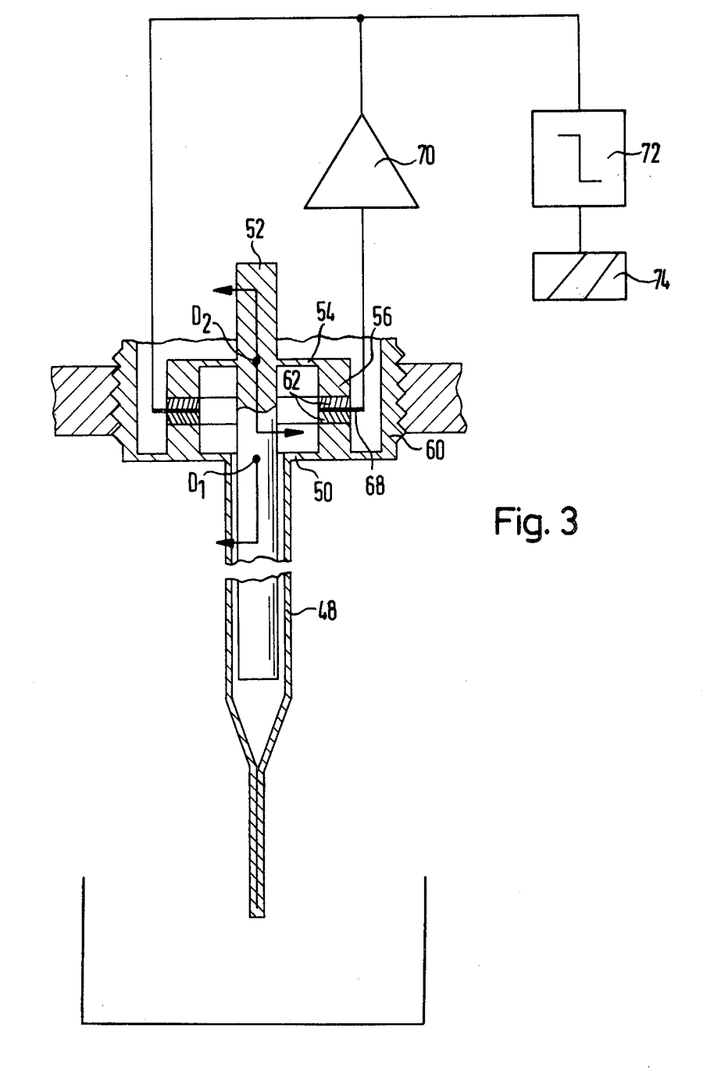
FIG. 3 is a sectional view of a suggested alternative embodiment of the apparatus according to the invention.

FIGS. 3 and 4 show an alternative embodiment of the invention. FIG. 3 represents a sectional view in the plane of vibration and FIG. 4 a sectional view vertically to the plane of vibration.

A vibrator element 48 extending into the space of a container is configured like a hollow tubular cylinder, and is pressed flat at its lower free end transverse to the direction of vibration. Its upper end is fixed concentrically in a membrane 50 acting as a restoring spring, in the neutral position the plane of the membrane 50 is perpendicular to the axis of the vibrator element 48. The vibrator element 48 thus oscillates in a rotary manner about axis $D_1$ positioned on a diameter of the membrane 50. A second vibrator element 52 is in the form of a solid cylinder or a rod, with its free end, projecting into the recess of the hollow cylinder of the first vibrator element 48. The upper half of the second vibrator element 52 is mounted concentrically in a membrane 54, similarly acting as a restoring spring. The vibrator element 52 oscillates in a rotary manner about axis $D_2$ positioned on a diameter of the membrane 54. The outer peripheries of the membranes 50 and 54 are interconnected by a tube or sleeve 56. The vibrator elements 48 and 52 are dimensioned to have the same resonant frequency. In order that the vibration structure composed of the vibrator elements 48, 52, the membranes 50, 54, and the connecting tube 56, has a stationary center of gravity during the vibration process, the mass distribution of the vibrator element 52 must be selected in a suitable manner below and above the membrane 54.

Therefore, it is not necessary that the centers of gravity of each vibrator element 48, 52 coincide with axis $D_1$ or $D_2$, respectively. This will be apparent from FIG. 1. A vibrator element $DS_1$ is configured as a tubular oscillator body and presents the mass $m_1$. The deflection from neutral position is marked by the angle $\alpha_1$. At the same time the pertinent center of gravity $S_1$ is thereby deflected for the length $L_1$.

Figure 1:
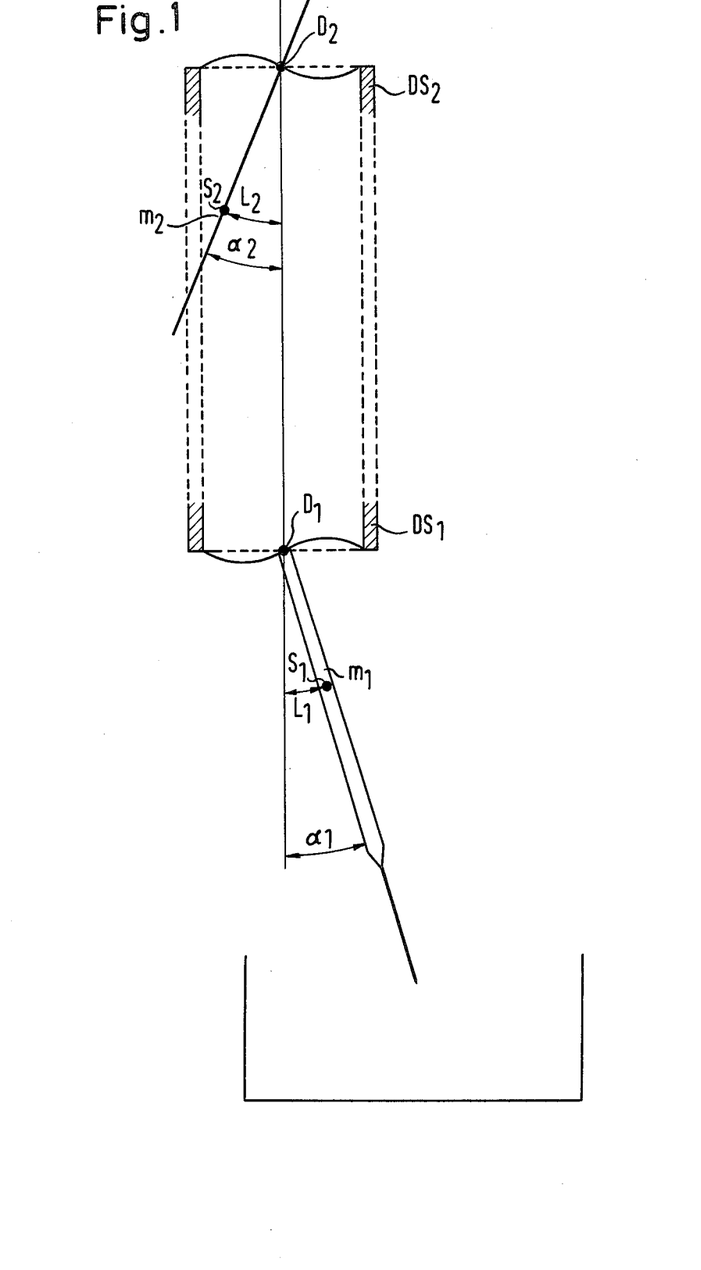
FIG. 1 is a diagram of principle of a vibration system.

A second vibrator element in the form of a rod-shaped an oscillator body $DS_2$ with the mass $m_2$ shall be arranged above the first vibrator element $DS_1$ and coaxially to same, and shall be moved from its neutral position for an angle $\alpha_2$.

Thereby its center of gravity $S_2$ is deflected for the length $L_2$. The rod-shaped rotary oscillator body $DS_2$ shall further extend into the rotary oscillator body $DS_1$ and therefore presents an essentially lower inertia moment of mass. With the understanding that both vibrator elements $DS_1$ and $DS_2$ have the same resonance frequency, the moment of force per radian of the vibrator element $DS_2$ must be adequately smaller than that of the vibrator element $DS_1$. The relation of the resonance frequency of an oscillator to the inertia moment of masses and to the moment of force per radian given by the following equation:

$$f = \tfrac{1}{2}\pi \sqrt{\frac{D}{J}}$$

where f stands for frequency, D for moment of force per radian and J for inertia moment of masses.

That the center of gravity of the total vibration system remains in rest position, is conditional on the following:

$$m_1 \times L_1 = m_2 \times L_2.$$

By a given vibrator element $DS_1$ with fixed values for the frequency, the inertia moment of masses, the moment of force per radian, the mass of the oscillating body as well as the distance of the center of gravity from the fulcrum and deflection angle, the corresponding values for the vibrator element $DS_2$ can be calculated. By a suitable distribution of the masses of the vibrator elements $DS_1$ and $DS_2$, especially the mass distribution of the oscillator body $DS_2$ before and behind the respective membrane, the center of gravity of the rotary oscillator body can be displaced in such a manner that the above requirement can be complied with. Although this requirement suffices to keep the center of gravity of the entire system in rest position, it is not sufficient to make the tube connecting the two individual vibrators stay in rest position, too. For if one constructs the vibration system as shown in FIG. 1, i.e. in such a manner that the centers of gravity $S_1$ and $S_2$ are spaced apart from each other in neutral position, then during the vibration process, due to the deflection of the centers of gravity $S_1$ and $S_2$ from their position of rest, the remaining parts of the individual oscillators would be deflected in the opposite sense. That means that a torque would act upon the tube connecting the two individual oscillators. In order to prevent this, the two single oscillators must be telescoped into each other so far that the two centers of gravity $S_1$ and $S_2$ will coincide in rest position. In this manner the vibration system, as shown in FIGS. 3 and 4, can be constructed even more compact at lower cost.

If the vibrator elements 48, 52 after in the embodiment of FIGS. 3 and 4 according to the above indicated requirements, are now adjusted to the same resonance frequency by adequately selecting their dimensions, and are excited into vibrations in mutually opposite directional phase but on the same vibration plane, then the torques of the two vibrator elements 48 and 52 will compensate themselves on the connecting tube 56 so that this will form the node of the vibration system along its entire length. In accordance with the embodiment of after FIG. 2, the embodiment of FIGS. 3 and 4 is likewise connected with a screw-in piece 60 via an annular membrane 58.

Piezoelectric systems are provided for exciting and measuring the vibrations. The tube 56 is partitioned transversely to its axis for accommodating piezoelectric elements 62. According to FIG. 4 the two portions are interconnected by means of two screwed connections 64. The screwing points are located on a diameter of the tube 56 running vertically to the vibration plane. Two spacer disks 66 provide a gap between the two sections of the tube 56. In the vibration plane on the diameter of the tube 56 between the two sections of the tube 56, there are disposed diametrally opposite two piezoelectric ceramic disks each to form a piezoelectric pair of transducers 62. Between the piezoelectric ceramic disks there is arranged each time a thin metal foil as electrode 68. The second electrode of the piezoelectric pairs of transducers 62 is provided by the sections of the tube 56 separated from each other, being electrically connected with each other via the screws 64. Thus the two piezoelectric ceramic disks of each pair of transducers are connected in parallel electrically and in series mechanically.

If an alternating voltage is applied to a piezoelectric pair of transducers 62, then the transducer in the rhythm of the alternating voltage will become thicker or thinner, respectively, and thus via the outer edges of the two membranes 50, 54 will excite the two vibrator elements 48, 52 into rotary vibrations in an opposing sense round their respective axes $DS_1$ and $DS_2$, respectively.

The second piezoelectric pair of transducers 62, being positioned in the opposite side of the tube 56, is constructed like the first pair of transducers and produces an alternating voltage dependent on the frequency and the amplitude of the mechanical vibration. In a known manner, the output signal is supplied to an electronic amplifier 70 and amplified by it in order to transmit the signal to the first piezoelectric pair of transducers 62. Thereby one obtains a feed-back system that as mentioned above, is vibrating like a conventional oscillator if the ring amplification is greater than 1. As in the first described embodiment, it also is applicable here, to wit: that the system will automatically vibrate on the mechanic resonance frequency of the mechanic oscillator. If the vibrator element 48 extending into the container is engaged with filling material, the vibration will be damped whereupon a threshold value discriminator 72 series connected to the amplifier is responding, that again makes a relay 74 reverse. When the filling level decreases, the lower end of the vibrator element 48 becomes uncovered again so that the system will start vibrating anew and the threshold value discriminator 72 switches back the relay 74.

By arranging the piezoelectric transducers between the tube sections, the requirement that the entire tube 46 forms a vibration node of the system is not met hundred percent, but due to the high quality of the vibration system and the considerably increased vibration amplitudes therefrom, the insignificant vibration amplitudes coming from the piezoelectric transducers, can be neglected and the suspension of the vibration system with the ring membrane 58 can be made on the tube 56 without reducing the sensitivity.

I claim:

1. An apparatus for determining the fill level of material in a container, comprising: a vibrating structure having first and second vibrator elements whose vibrations are attenuated when engaging filling material present in the container, one of said vibrator elements being arranged coaxially with respect to the other vibrator element and at least partially surrounding said other element in spaced relation thereto, both of said vibrator elements being flexibly mechanically coupled for individual oscillatory vibration in a common plane about mutually spaced axes, and being so dimensioned and configured to have the same no-load resonant frequency, means for exciting said elements into vibration of mutually opposite directional phase, the first of said vibrator elements extending downwardly and adapted to engage material in the container to implement determining the fill level thereof.

2. An apparatus according to claim 1, characterized thereby that the vibrator element (10) extending downwardly into the container is projecting into a recess provided in the second vibrator element (12).

3. An apparatus according to claim 2, characterized thereby that each of the vibrator elements (10, 12; 48, 52) is arranged in the center of a respective membrane acting as a restoring spring (18, 26; 50, 54), of which the planes in neutral position run vertically relative to the axes of the vibrator elements, where the outer edges of the membranes are rigidly connected with each other by means of a tubular element (28; 56).

4. An apparatus according to claim 3, characterized thereby that the second vibrator element (12) comprises upper and lower cylinders (20, 22) rigidly connected with each other and having a through hole to accept the upper part of the first vibrator element (10).

5. An apparatus according to claim 4, characterized thereby that the two cylinders (20, 22) in the center of the membrane (26) are rigidly connected with each other by means of a third cylinder (24) of a smaller diameter as compared to the two cylinders and likewise being provided with the through hole.

6. An apparatus according to claim 5, characterized thereby that in the upper cylinder (20) a coil (34) is embedded for an electro-magnetic vibration driving system, which coil is surrounded by a tube (36) presenting a magnetic armature and defining at the same time the circumferential surface of the upper cylinder (20).

7. An apparatus according to claim 6, characterized thereby that the upper cylinder (20) is penetrated radially in its vibration plane by two rod-shaped means (38) surrounding the coil (34) in the form of pins of magnetic soft material, between the tube (36) and the recess.

8. An apparatus according to claim 7, characterized thereby that the tube (36), the rod-shaped means (38) acting as magnetic poles, as well as the solid cylinder (14) define a magnetic circle.

9. An apparatus according to claim 6, characterized thereby that the first vibrator element (10) comprises a solid cylinder (14) which is made of magnetic soft material at least within the range of the coil (34).

10. An apparatus according to at least claim 6, characterized thereby that the coil (14) can be supplied with pulsating direct current, that can be derived from an electric signal received from a piezoelectric element (40) or a wire strain gauge mounted on the membrane (18) of the first vibrator element (10).

11. An apparatus according to claim 10, characterized thereby that the electric signal can be supplied to an amplifier (42) in order to lead it on the one hand to the coil (34) and on the other hand to a threshold value discriminator (44) after which there is arranged a switching means (46) for determining and/or controlling the filling level in the container.

12. An apparatus according to claim 3, characterized thereby that the first vibrator element (48) is a hollow cylinder connected with its upper end to the membrane (50), and its lower end being pressed flat to form a paddle.

13. An apparatus according to claim 3, characterized thereby that the element (56) connecting the outer edges of the membranes (50, 54) is a tube being subdivided into a lower and an upper section, where between these sections two piezoelectric elements each are arranged diametrally as to each other in order to define piezoelectric pairs of transducers (62).

14. An apparatus according to claim 13, characterized thereby that an electric signal of one pair of the piezoelectric transducers can be supplied to an amplifier (70), and that this signal after amplification can be supplied not only to the other piezoelectric transducer but also to a threshold value discriminator (72).

15. An apparatus according to claim 3, characterized thereby that the center of gravity of each vibrator element (10, 12; 48, 52) is coinciding with the center of the respective membrane (18, 26; 50, 54).

16. An apparatus according to claim 3, characterized thereby that the center of gravity resulting from the vibrator elements (10, 12; 48, 52), the membranes (18, 26; 50, 54) and the elements (28; 56) connecting the edges of same, is static in a vibrating system.

17. An apparatus according to claim 3, characterized thereby that the element (28; 56) connecting the two membranes (18, 26; 50, 54), when the system is vibrating, is in steady position even then when the center of gravity of each vibrator element (10, 12; 48, 52) does not coincide with the center of the respective membrane (18, 26; 50, 54), (10, 12; 48, 52) the centers of gravity being positioned in such a manner that the vibration amplitudes of same from neutral position multiplied with the respective mass of the vibrator element are of the same value.

18. An apparatus according to claim 2, characterized thereby that the downwardly extending vibrator element (10) comprises a solid cylinder (14) being rigidly connected with a hollow cylinder (16) of which the free (lower) end is pressed flat to form a paddle.

19. An apparatus according to claim 1, characterized thereby that the (first) vibrator element (48) extending downwardly into the container has a recess into which the second vibrator element (52) is projecting.

20. An apparatus according to claim 19, characterized thereby that the second vibrator element (52) is a solid cylinder, of which the lower end is projecting into the recess of the first element (48).

21. An apparatus according to claim 20, characterized thereby that the solid cylinder (52), preferably within the area of its upper half, is connected to a membrane (54).

* * * * *